United States Patent
Caliebe et al.

(10) Patent No.: US 12,072,727 B2
(45) Date of Patent: Aug. 27, 2024

(54) CONTROL UNIT FOR A UTILITY VEHICLE

(71) Applicant: elobau GmbH & Co. KG, Leutkirch (DE)

(72) Inventors: Simon Caliebe, Isny (DE); Roland Butscher, Isny (DE); Ulrich Gerhardt, Altusried (DE)

(73) Assignee: ELOBAU GMBH & CO. KG, Leutkirch (DE)

( * ) Notice: Subject to any disclaimer, the term of this patent is extended or adjusted under 35 U.S.C. 154(b) by 0 days.

(21) Appl. No.: 17/898,014

(22) Filed: Aug. 29, 2022

(65) Prior Publication Data

US 2023/0065263 A1 Mar. 2, 2023

(30) Foreign Application Priority Data

Aug. 30, 2021 (DE) ............. 10 2021 122 397.0

(51) Int. Cl.
*G05G 9/047* (2006.01)
(52) U.S. Cl.
CPC ... *G05G 9/047* (2013.01); *G05G 2009/04766* (2013.01); *G05G 2009/04774* (2013.01); *G05G 2505/00* (2013.01)
(58) Field of Classification Search
CPC ......... G05G 9/047; G05G 2009/04774; G05G 5/28; G05G 5/005
See application file for complete search history.

(56) References Cited

U.S. PATENT DOCUMENTS

| | | | | |
|---|---|---|---|---|
| 9,216,743 B2* | 12/2015 | Wimmer | ............... | B60W 50/00 |
| 10,088,915 B2* | 10/2018 | Drum | ................... | G06F 3/0338 |
| 2004/0011154 A1* | 1/2004 | Dybro | ..................... | G05G 5/28 |
| | | | | 74/471 XY |
| 2007/0002016 A1* | 1/2007 | Cho | ...................... | G06F 1/1684 |
| | | | | 345/157 |
| 2008/0250889 A1* | 10/2008 | Mack | ...................... | B62D 1/12 |
| | | | | 74/471 XY |
| 2010/0275589 A1* | 11/2010 | Meyers | ................ | E02F 9/2004 |
| | | | | 60/494 |
| 2017/0305453 A1 | 10/2017 | Nishio et al. | | |

FOREIGN PATENT DOCUMENTS

| | | | | |
|---|---|---|---|---|
| DE | 102005018220 A1 | 11/2006 | | |
| DE | 102006029507 A1 | 3/2007 | | |
| DE | 102012223505 A1 | 6/2014 | | |
| DE | 102013019570 A1 | 5/2015 | | |
| EP | 3264231 B1 * | 1/2021 | ............ | G05G 9/047 |
| WO | 2005096131 A2 | 10/2005 | | |
| WO | 2013176944 A2 | 11/2013 | | |
| WO | 2020184702 A1 | 9/2020 | | |

* cited by examiner

*Primary Examiner* — Gregory Robert Weber
(74) *Attorney, Agent, or Firm* — Dickinson Wright PLLC

(57) ABSTRACT

An operating unit for a utility vehicle is provided. The operating unit has a grip zone, at least one actuation unit and a control unit. The grip zone includes a plurality of contact-detecting sensor units. The control unit is designed to detect signals from the sensor units and to identify an intended operation on the basis of the signals. An arrangement of the sensor units is formed in such manner that various hand positions are identifiable by means of the control unit. The control unit is designed to release control signals generated by the operating unit and/or the at least one actuation unit depending on the position of the hand.

5 Claims, 4 Drawing Sheets

CONTROL UNIT FOR A UTILITY VEHICLE

This U.S. patent application claims priority to German patent application no. 10 2021 122 397.0, filed Aug. 30, 2021, the entire contents of which is incorporated herein by reference in its entirety.

BACKGROUND

1. Technical Field

The present invention relates to an operating unit for a utility vehicle, including a grip zone, at least one actuation unit and one control unit, wherein the grip zone has a plurality of contact-detecting sensor units, wherein the control unit is designed to detect signals from the sensor units and to identify an intended operation on the basis of the signals.

2. Related Art

An operating unit for use in a utility vehicle, particularly in off-road vehicles, typically serves to control an immensely wide range of moving component. This control is enabled on the one hand by a swivelling movement of the operating unit itself and on the other hand by actuation units, in the form of buttons or thumbwheels for example, arranged on the operating unit. Besides the grip zone, the operating unit therefore also includes the sensor units described in the introduction. The operating unit can be actuated unintentionally, particularly due to unevennesses in the road or inadvertent contact by the user. This leads to unintended movements of the moving components, which in turn may result in damage to property or personal injury.

Apparatuses are therefore known from the related art, US 2013/325151 A1 discloses a contact-sensitive control assembly having a control lever with a handpiece, wherein the handpiece is equipped with a sensor matrix for detecting contact in a grip zone, and an evaluation unit outputs a signal to enable use of the control assembly if one or more limit values are reached. The limit values further comprise for example coverage of a predetermined grip zone, certain contact points between user and grip zone, and/or expected duration in time of the contact between user and grip zone. The sensors are in particular capacitive, heat-sensitive or designed with infrared.

DE 10 2014 214 989.4 discloses a control assembly for a utility vehicle, which includes a control lever with a handpiece, wherein the handpiece has a grip zone with a multiplicity of contact-detecting sensor units. The control assembly further includes an evaluation unit for generating a hand presence signal during an actuation intention by a user, wherein a plurality of contact conditions are specified for identifying a hand position based on contact conditions.

EP 3 264 231 B1 discloses an apparatus for converting hand or finger positions or movements into electrical signals, wherein the apparatus includes a lever for accommodating one or more fingers or a part of a hand, a lever displacement sensor, a plurality of contact sensors for identifying a hand position, and an electrical data processor. The electrical data processor is designed as a data processor which generates an electrical output signal based on an electrical input signal using a control response ratio between an electrical input signal and an electrical output signal, said ratio being determined by the identical configuration or similarity of the hand position to a reference contact map.

A user of the operating unit often controls the moving components of the utility vehicle for several hours at a time. In such a case, the need to keep the hand in a given position constantly to confirm the presence of the hand is ergonomically extremely unfavourable and can cause chronic pain. Loss of concentration as a result of remaining in one position for a prolonged period is also not to be ruled out.

The problem addressed by the present invention is therefore that of identifying an intended operation depending on various hand positions.

SUMMARY

This problem is solved with an operating unit for a utility vehicle which includes a grip zone, at least one actuation unit and one control unit, wherein the grip zone has a plurality of contact-detecting sensor units, wherein the control unit is designed to detect signals from the sensor units and to identify an intended operation on the basis of the signals, wherein an arranged of the sensor units is designed in such manner that different hand positions are identifiable by means of the control unit, wherein the control unit releases control signals generated by the operating unit and/or the at least one actuation unit depending on the hand position.

According to the invention, the operating unit features a grip zone shape which is comfortable and ergonomically adapted for a user. According to the invention, an actuation unit is provided in an upper area of the operating unit, and may be arranged on a side that is closer to or farther away from the user in actual use. According to the invention, an actuation unit is designed as a button, a switch or a thumbwheel. Other mechanical and electrical actuation units, in particular a touchpad also fall within the scope of the invention. An actuation unit on the side closer to the user is advantageously operable with the thumb, and the actuation unit on the side farther from the user is advantageously operable with the index and middle fingers when the user ergonomically clasps the actuation handle with four fingers and rests his thumb on the top face of the actuation handle or on the side closest to him in actual use.

Besides control of the moving components via this actuation, of course such control is also exercised by movement of the operating unit itself.

The multiplicity of sensor units according to the invention is arranged on the side closest to the user in the grip zone, and arranged over the entire length of the grip zone. The arrangement of the sensor units in the grip zone is preferably not uniform, wherein those areas of the operating unit for which contact is to be expected during use have a greater density of sensor units. Alternatively, a uniform arrangement of the sensor units over the operating unit also falls within the scope of the invention. This arrangement of the sensor units enables identification of different hand positions.

According to the invention, the sensor units are embodied as capacitive, inductive, optical, resistive or temperature sensors. According to the invention, at least two, advantageously at least four different hand positions may be identified. This identification is performed on the basis of contacting the operating unit with the palm of a hand and/or a finger, in particular a fingertip and/or the ball of the thumb.

Provision is advantageously made for a user to receive a prompt from the apparatus to change position, after a hand position has been maintained for a predefined period of time, for example, or if a hand position is assessed as unsuitable for control or fatiguing for the user. According to the invention, this prompt is an optical, acoustic or haptic signal, output by a first output unit. This advantageously increases the user's effectiveness, mobility and ability to concentrate. This first output unit is located either directly on the operating unit or otherwise independently of said operating unit inside the utility vehicle.

The risk of inadvertent activation of the operating unit or an actuation unit is increased or reduced depending on the position of the hand. Accordingly, the control signals of the actuation unit must be released variably upon identification of a hand position. If a hand position is identified in an upper area of the operating unit, there is increased risk of an inadvertent actuation of the actuation units located there. According to the invention, a second output signal is transmitted with the swivelling movement of the operating unit and/or actuation units is released, which signal confirms the release of the corresponding control signals to the user. The second output signal also serves to inform a user that he must change his hand position if he wishes to continue using an actuation unit which has been deactivated in his current hand position. According to the invention, the second output signal is an optical, acoustic or haptic, in particular a signal with distinctive illumination of the actuation units using various colours or lighting intervals. Alternatively, output of the second output signal by means of lamps on an external display also falls within the scope of the invention.

In a further development of the invention, is provided that different hand positions are identified by means of predefined signal patterns of the sensor units. The signal patterns needed for this are stored in the control unit. According to the invention, each of at least two sensor units must detect a contact for a hand position to be identified. If such a contact of the operating unit is detected by the sensor unit, the identified measurement signal pattern is compared with the predefined signal patterns, and if it matches one of these patterns, the corresponding control signal is released. The signal patterns are of such kind that they reflect all possible hand positions on the operating unit. Detection of individual hand positions of the user by the sensor units and storing this individual signal pattern in the control unit also falls within the scope of the invention. It is highly advantageous that the system according to the invention may thus be adapted individually to an operator and his hand positions. In this context, such signal patterns that would be generated by hand positions that threaten the health of a user are excluded from storage. According to the invention, such hazardous hand positions together with the associated signal patterns have been calculated in advance.

In a further development of the invention, is provided that a sensor unit is read out individually, and/or a grouping of a multiplicity of sensor units is or can be read out. When measurement signals of individual sensor units are read out, they are captured and processed further in the control unit.

But the unique nature of the physical qualities of a user's hand and the unique nature of the grasping positions make it very difficult to define all potentially possible signal patterns in advance. To address this, in a further development the invention suggests that a grouping of sensor units also be read out together. Such a grouping is formed by at least two adjacent sensor units, wherein in this context "adjacent" is defined in particular as being arranged immediately next to each other. Reading out of the measurement signals of this grouping together is advantageous, because this means a contact with individual deviations is also detected as a proper grip and release of the control signal is enabled. For this purpose, according to the invention most importantly a tolerance is provided in the number of contact identifications by the sensor units of the grouping. Thus, a release of the control signals may be effected even if the number of contact identifications is lower than the number of sensor units of a grouping, providing the number has not fallen below a limit value. In other words, the invention identifies a proper and predefined hand position even if contacted by only three instead of four fingers, for example. A signal pattern may consist not only of measurement signals from at least two individual sensor units, but also of measurement signals from at least one grouping or a combination of measurement signals from at least one individual sensor unit and at least one grouping In any case, at least two sensor units must identify a contact in order to form a signal pattern that identifies a hand position. According to the invention the limit value—the tolerance—for a difference between the number of sensor units and the contact identifications in a grouping is not more than 50%, advantageously not more than 35%, particularly advantageously not more than 20%.

A control unit according to the invention identifies the signal from the sensor unit as contact when the signal rises above or falls below a threshold value. Depending on the method applied for calculating the signal, the value of the signal rises or falls in response to a contact. In the case of a rising signal value for contact, a limit value must be exceeded for a contact to be identified. In the case of a falling signal value for contact, the signal must similarly fall below a limit value for a contact to be identified. Since utility vehicles are typically used in harsh environments with high levels of dirt, it is easily possible that the operator's hand may be dirty or covered by a protective glove. It is therefore provided that the threshold value, above or below which a measurement signal is identified in the control unit as contact, must be selected such that the control unit is able to reliably detect contact by a user in different variants, in particular the threshold value is at least 20% above/below the signal in the absence of contact. Additionally, contact may be identified from the speed of change of the signal, that is to say from the first derivative of a signal curve. If there is a steep flank, in particular an abrupt change in the signal curve, or a high/low value of the first derivative is reached, the contact is identifiable.

The maintenance of a hand position once it has been identified and consequently release of the control signals even if the sensor units themselves are without contact for a predefined, brief idle time, also falls within the scope of the invention. As a result, for example, a brief change of grip does not cause a block of the control signals, a smooth work process is still assured. According to the invention, the idle time is selected as less than 1 second, advantageously less than 0.8 second, particularly advantageously less than 0.6 second.

In a variant of the invention, it is provided that a reset resistance is or has been adjusted within a swivelling movement of the operating unit as a function of the hand position. An operator must apply different shifting forces to rotate the operating unit according to his hand position due to the respective lever action, in particular to execute the same swivelling movement against the reset force. This situation is counteracted according to the invention by adapting the reset resistance as a function of the hand position. The reset resistance is adapted particularly advantageously through the use of a magnetorheological fluid. Other mechanical or chemical components for adapting the reset resistance also fall within the scope of the invention. Accordingly, if a user holds the operating unit in an upper area and consequently a large leverage is present on the swivel axis, a greater reset force is chosen than if the user holds the operating unit in a lower area: Here, the lever action is considerably reduced. Consequently, according to the invention a substantially constant application of force is set for operating the operating unit regardless of the actual hand position. This measure also reduces incorrect operation due to the application of too much or too little force.

According to the invention, a sequential signal pattern generated by a movement of the user's hand locks or unlocks the operating unit for use. Thus, the invention identifies not only purely static signal patterns, but also sequential signal patterns by means of the sensor units and the control unit. These sequential signal patterns serve above all to enable a general release of the operating unit before it is used for the first time, as this can only take place if a predefined sequence of movements is carried out and identified. A sequential signal pattern of such kind according to the invention is for example a sequence of predefined hand positions, or it may also be a sequence of contacts with individual sensor units or groupings. The operating unit is only activated for normal operation by means of hand position identification when a user has created this sequential sequence of certain signal patterns. If a user leaves his workplace, he carries out a predefined sequential series of certain signal patterns again so that the operating unit cannot be used, even if a hand position matching a signal pattern is identified, until the lock put in place is cancelled subsequently by the sequential signal pattern.

BRIEF DESCRIPTION OF THE DRAWINGS

In the following text, the invention will be explained in greater detail using an embodiment thereof and with reference to the figures of the drawing, wherein.

DETAILED DESCRIPTION OF EXAMPLE EMBODIMENTS

Figure 1:
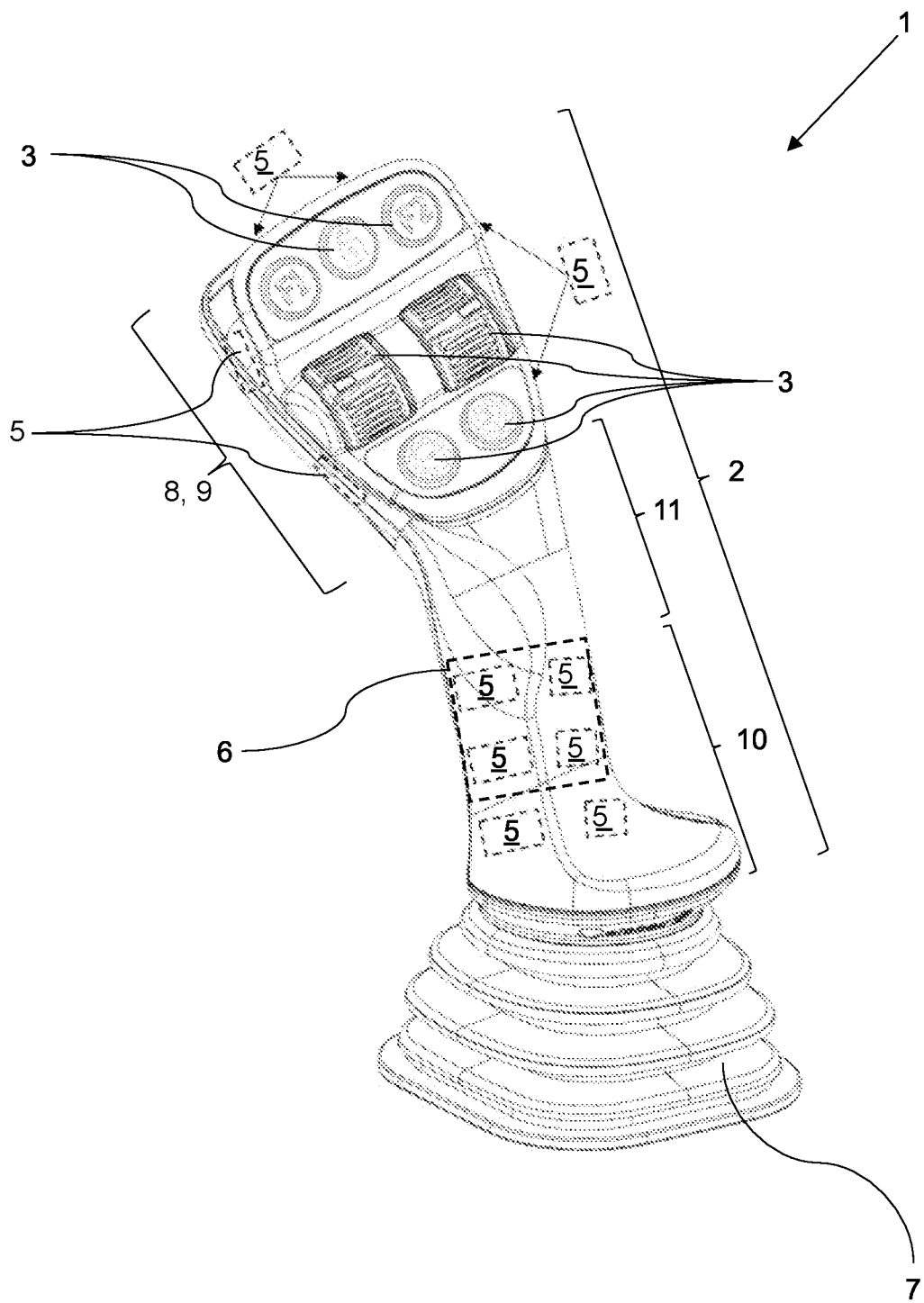
FIG. 1 shows a perspective view of a operating unit.

FIG. 1 shows a perspective view of an operating unit 1, wherein besides a grip zone 2 the operating unit 1 also includes a gaiter 7 and an actuation zone 8. The gaiter 7 is arranged below the grip zone 2 and guarantees a water- and dust-tight connection between operating unit 1 and a control surface (not shown) of a utility vehicle. The actuation zone 8 is arranged in an upper area 9 of the operating unit 1, wherein actuation units 3 in the form of buttons and thumbwheels are arranged therein. Six contact-detecting sensor units 5 are arranged around the actuation zone 8. Another six sensor units 5, positioned in a grid, are arranged in a lower area 10 of the operating unit 1. Four of the six sensor units 5 arranged in a lower area 10 can be combined to form a grouping 6. In this embodiment of the invention, all sensor units 5 are arranged substantially on a side closest to the user. Accordingly, the operating unit 1 has a greater density of sensor units 5 in its upper and lower areas 9, 10 than in a middle area 11.

Figure 2A:
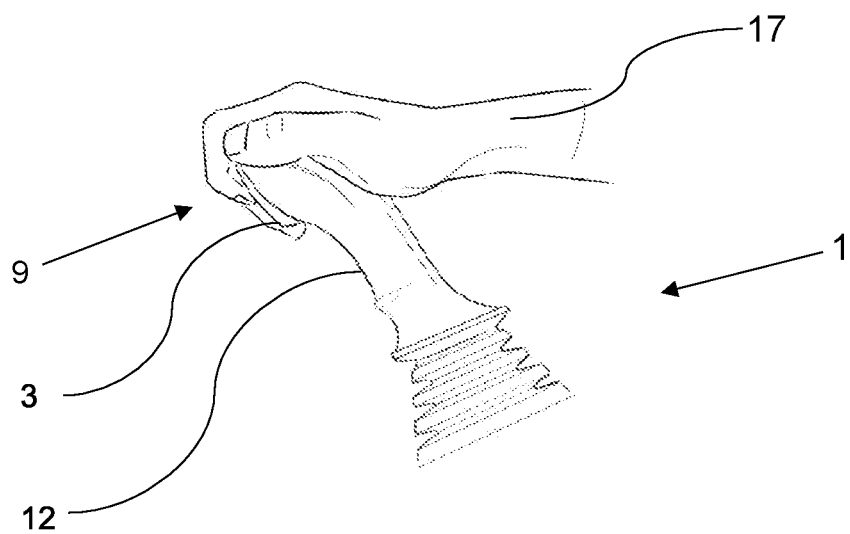
FIG. 2a shows a side view of a operating unit in a first hand position during use.
Figure 2B:
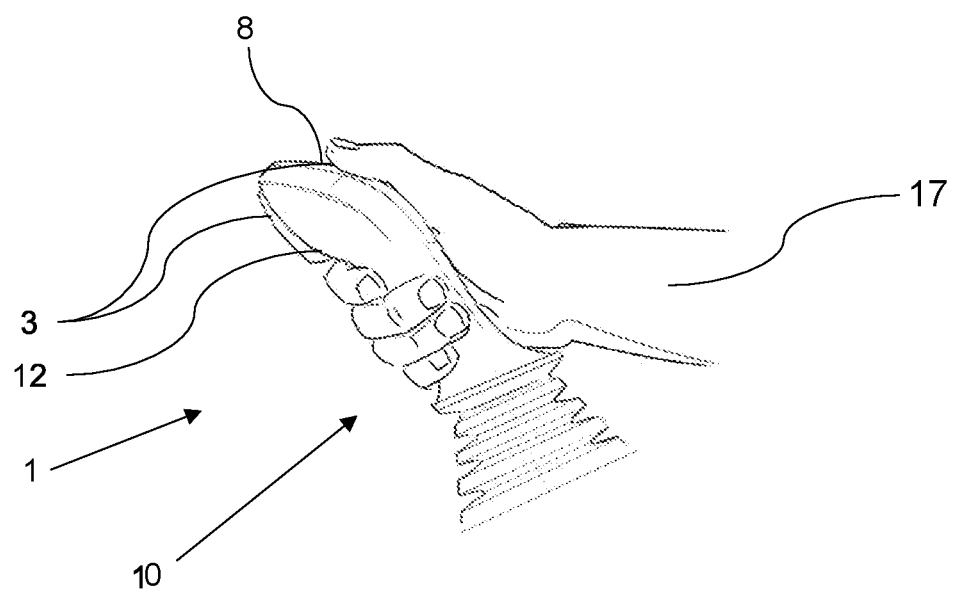
FIG. 2b shows a side view of a operating unit in a second hand position during use.
Figure 2C:
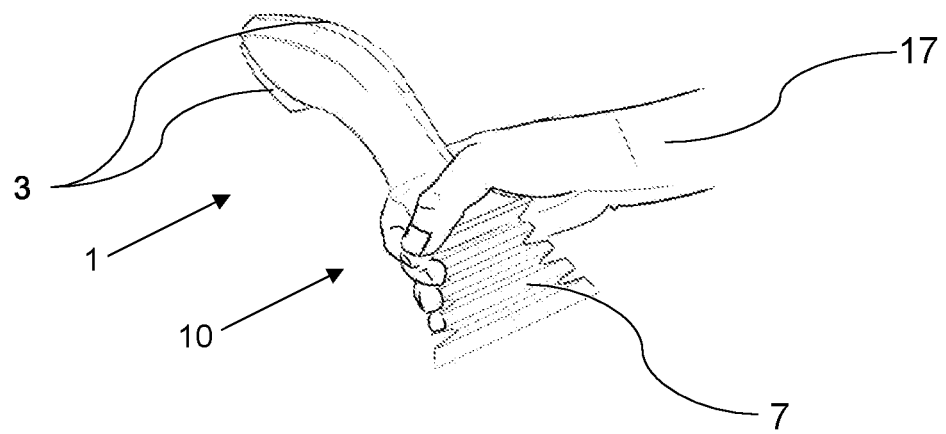
FIG. 2c shows a side view of a operating unit in a third hand position during use.
Figure 2D:
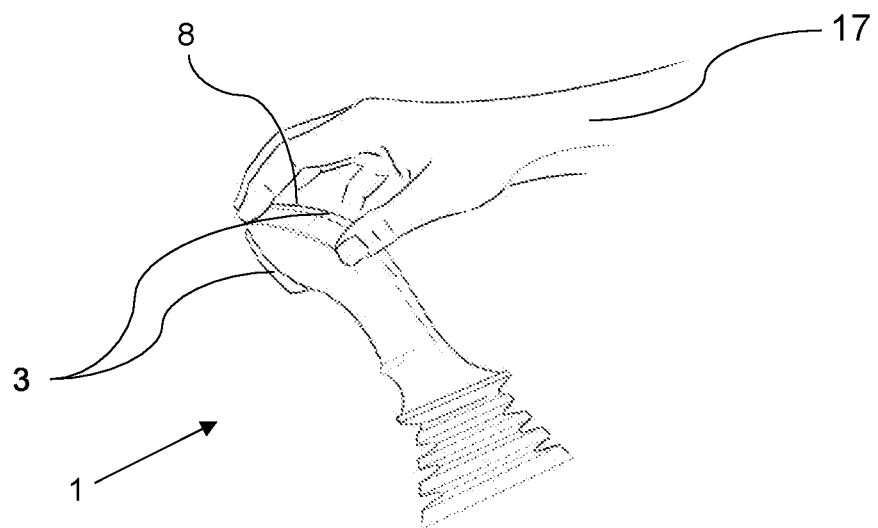
FIG. 2d shows a side view of a operating unit in a fourth hand position during use.

FIGS. 2a-2d show side views of an operating unit 1 in various hand positions during use, wherein FIG. 2a shows a first hand position, FIG. 2b a second hand position, FIG. 2c a third hand position and FIG. 2d a fourth hand position.

The first hand position (FIG. 2a) is identified via the sensor units 5 arranged in an upper area 9. When the operating unit 1 is in use in a first hand position, the hand 17 is placed so as to cover the actuation zone 8, which can lead to an inadvertent actuation of the actuation units 3 located there. Accordingly, control signals 18 from actuation units 3 arranged in the actuation zone 8 are not released when a first hand position is identified. Actuation units 3 are also arranged on a side 12 farther from user. These can be reached in particular with the user's index and/or ring finger, so that the control signals 18 therefrom are released when the first hand position is identified.

When the operating unit 1 is in use in a second hand position (FIG. 2b), a ball of the thumb on the hand 17 rests in the lower area 10 of the operating unit 1, and the actuation zone 8 can be reached in particular by the user with the thumb. The actuation unit 3 on the farther side 12 can be reached in particular by the user with the index and/or middle finger. Since there are no actuation units 3 arranged in the lower area 10 and such a positioning of the hand 17 also does not restrict the swivelling movement of the operating unit 1, all control signals 18 of the operating unit 1 and the actuation units 3 are released. The hand position is identified in particular via the sensor units 5, which are arranged in a lower area 10.

FIG. 2c shows a third hand position, in which the hand 17 is extended over the lower area 10 and over parts of the gaiter 7. It is not absolutely necessary to restrict the release of the actuation units 3 here, since they are unreachable for the operator's hand 17, and the risk of an inadvertent actuation is therefore also low. The lever action applied by a user is in particular considerably reduced in this third hand position compared with the first hand position, with the result that the reset resistance is adapted and the swivelling movement is calibrated according to the invention.

A fourth hand position, in which the operating unit 1 is contacted in particular via the fingertips of the hand 17, is represented in FIG. 2d. The actuation units 3 cannot be reached by the user with his fingers due to the control of operating unit 1. However, there is a risk of inadvertently actuating the actuation units 3 located in actuation zone 8 if the fingers slip while controlling. Accordingly, a release of the control signals 18 for these actuation units 3 is not realised upon identification of the fourth hand position.

Figure 3:
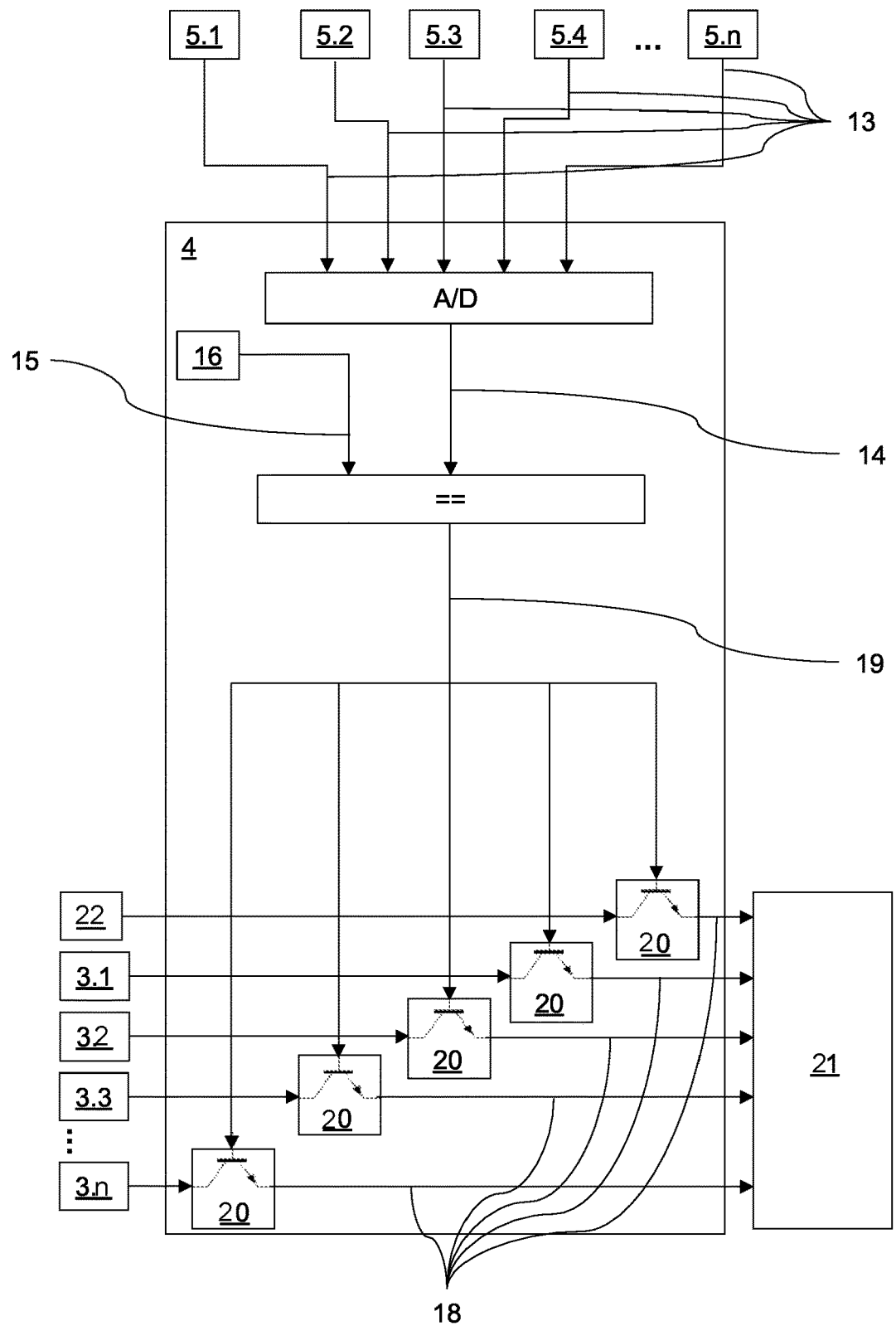
FIG. 3 shows a flowchart for controlling the operating unit.

FIG. 3 shows a flowchart for requesting the release of control signals 18 of operating unit 1, wherein measurement signals 13 from a multiplicity of sensor units 5, embodied in particular as capacitive sensors, are forwarded to a control unit 4, which is embodied as a microcontroller. In the control unit 4, the measurement signals 13 are converted into digital values, wherein 1 defines the identification of a contact and 0 defines no contact. The digital values can be combined in a measurement signal pattern 14. This measurement signal pattern 14 is compared with predefined signal patterns 15 from a memory unit 16. If the measurement signal pattern 14 generated by a user's contact matches a signal pattern 15, a hand position based on the signal pattern 15 stored in the memory unit 16 is determined. After a hand position or no hand position has been determined, corresponding release signals 19 are forwarded to switches 20, which are provided in particular in control unit 4. The embodiment of the switches 20 as external transistors, field effect transistors (FETs), or other electrical, chemical or mechanical switches also falls within the scope of the invention. The control signals 18 triggered by a user via a movement calculation unit 22 of the operating unit 1 and/or the actuation units 3.1, 3.2, 3.3, 3.n are forwarded to the corresponding subsequent electrical and mechanical machine components 21 (not shown) of the utility vehicle via the switches 20, if the corresponding release signal 19 closes the switch 20. If an unambiguous hand position cannot be determined after comparing the existing measurement signal pattern 14 with the signal patterns 15, release of the control signals 18 is blocked, and the switch 20 is opened correspondingly.

The invention claimed is:

1. An operating unit for a utility vehicle, having a grip zone, at least one actuation unit and a control unit, wherein the grip zone includes a plurality of contact-detecting sensor units, wherein the control unit is designed to detect signals from the sensor units and to identify an intended operation on the basis of the signals, wherein an arrangement of the sensor units is formed in such manner that various hand positions are identifiable by the control unit, wherein the control unit is designed to enable a control signal generated by the operating unit and/or the at least one actuation unit in each case depending on the position of the hand, which a grouping of the sensor units of the grip zone are read out together, the grouping includes at least two adjacent sensor units, and an enablement of the control signal may be effected even if the number of contacts identified is lower than the number of sensor units of the grouping; and wherein when the sensor units identify that at least one finger of the hand is in a first hand position and that at least one finger of the hand covers a first actuation zone including a first one of the at least one actuation unit, then the control signal from the first actuation unit is not enabled; and when the sensor units identify that at least one finger of the hand is in the first hand position and that at least one finger of the hand covers a second actuation zone spaced from the first actuation zone and including a second one of the at least one actuation unit, then the control signal from the second actuation unit is enabled.

2. An operating unit according to claim 1, wherein the identification of various hand positions is designed to be performed by predefined signal patterns of the sensor units.

3. An operating unit according to claim 1, wherein the control unit is designed to identify the signal from the sensor unit as one of the contacts when the value of the signal exceeds or falls below a threshold value.

4. An operating unit according to claim 1, wherein a reset force is designed to be adaptable during a swivelling movement of the operating unit depending on the hand position.

5. An operating unit according to claim 1, wherein a sequential signal pattern, generated by a user's hand movement, functions to lock and/or unlock the operating unit for use.

* * * * *